US012654111B2

(12) United States Patent (10) Patent No.: US 12,654,111 B2
Cody (45) Date of Patent: Jun. 16, 2026

(54) SYSTEM FOR DESALINATING SALTWATER

(71) Applicant: John Markham Cody, Havana, FL (US)

(72) Inventor: John Markham Cody, Havana, FL (US)

( * ) Notice: Subject to any disclaimer, the term of this patent is extended or adjusted under 35 U.S.C. 154(b) by 0 days.

(21) Appl. No.: 14/989,202

(22) Filed: Jan. 6, 2016

(65) Prior Publication Data

US 2017/0189830 A1 Jul. 6, 2017

(51) Int. Cl.
B01D 1/00 (2006.01)
B01D 1/30 (2006.01)
(Continued)

(52) U.S. Cl.
CPC ............. B01D 1/0035 (2013.01); B01D 1/30 (2013.01); B01D 5/0006 (2013.01); B01D 5/006 (2013.01); C02F 1/004 (2013.01); C02F 1/14 (2013.01); C02F 2103/08 (2013.01); C02F 2201/005 (2013.01); C02F 2209/40 (2013.01); C02F 2209/42 (2013.01); C02F 2307/14 (2013.01);
(Continued)

(58) Field of Classification Search
CPC ........ B01D 1/0035; B01D 1/30; B01D 5/006; B01D 5/0006; C02F 1/004; C02F 1/14; C02F 2209/40; C02F 2209/42; C02F 2103/08; C02F 2201/005
See application file for complete search history.

(56) References Cited

U.S. PATENT DOCUMENTS 1,940,803 A * 12/1933 Kallam .................... B01D 3/14
196/132
3,500,615 A * 3/1970 Meek ........................ B01J 19/32
261/100
(Continued)

FOREIGN PATENT DOCUMENTS

CN 203498115 U * 3/2014
CN 105174339 A * 12/2015

OTHER PUBLICATIONS

Coil. (n.d.) In Merriam Webster Online, Retrieved Nov. 14, 2017, from https://www.merriam-webster.com/dictionary/coil (Year: 2017).*
(Continued)

*Primary Examiner* — Gabriel E Gitman
(74) *Attorney, Agent, or Firm* — Ariel S. Bentolila; Bay Area IP Group

(57) ABSTRACT

A system for separating salt and/or minerals from ocean, sea, brackish, or brine water collected in a water enclosure. The water enclosure is heated with solar radiation to increase a rate of evaporation of the saline water and produce humidity or moisture within the water enclosure for conversion to desalinated water. Due to condensation, water collects as droplets on cold surfaces of cooling coils when the humidity or moisture comes in contact with the cold surfaces of the cooling coils. The water droplets, which are desalinated, are gathered by condensation capture pans. Output lines channel the collected desalinated water out of the pans for consumption and/or storage. Re-saturation units increase a rate of condensation within the water enclosure, thereby, increasing a collection of the desalinated water.

17 Claims, 3 Drawing Sheets

(51) Int. Cl.
| | | |
|---|---|---|
| *B01D 5/00* | (2006.01) |
| *C02F 1/00* | (2023.01) |
| *C02F 1/14* | (2023.01) |
| *C02F 103/08* | (2006.01) |

(52) U.S. Cl.
CPC ........... *Y02A 20/124* (2018.01); *Y02A 20/142* (2018.01); *Y02A 20/212* (2018.01); *Y02W 10/37* (2015.05)

(56) References Cited

U.S. PATENT DOCUMENTS

| | | | | |
|---|---|---|---|---|
| 4,330,373 | A | | 5/1982 | Liu |
| 4,345,971 | A | * | 8/1982 | Watson .................. B01D 3/007 |
| | | | | 202/177 |
| 4,749,484 | A | * | 6/1988 | Greenhut ............... C02F 1/003 |
| | | | | 210/472 |
| 4,834,840 | A | * | 5/1989 | Capella ................... B01D 1/26 |
| | | | | 159/47.3 |
| 5,096,543 | A | * | 3/1992 | Elmore ................... B01D 1/16 |
| | | | | 202/172 |
| 5,628,879 | A | * | 5/1997 | Woodruff ................. C02F 1/14 |
| | | | | 202/234 |
| 8,088,257 | B2 | * | 1/2012 | Kemp ................. B01D 1/0035 |
| | | | | 159/901 |
| 2003/0033805 | A1 | * | 2/2003 | LaViolette ............ B01D 3/346 |
| | | | | 60/641.8 |
| 2004/0031389 | A1 | * | 2/2004 | Heath ................. B01D 53/263 |
| | | | | 95/193 |
| 2004/0060808 | A1 | * | 4/2004 | LaViolette .............. F24S 10/25 |
| | | | | 203/1 |
| 2004/0159615 | A1 | * | 8/2004 | Leffler ...................... C02F 1/12 |
| | | | | 210/764 |
| 2005/0127115 | A1 | * | 6/2005 | Underwood .............. C02F 9/20 |
| | | | | 222/481 |
| 2008/0105529 | A1 | * | 5/2008 | Burke ...................... B01D 3/06 |
| | | | | 202/185.1 |
| 2010/0032280 | A1 | * | 2/2010 | Akers .................... B01D 5/006 |
| | | | | 202/234 |
| 2011/0024281 | A1 | * | 2/2011 | Kemp ..................... B01D 1/02 |
| | | | | 202/234 |
| 2011/0139599 | A1 | * | 6/2011 | Al-Garni ............... B01D 5/006 |
| | | | | 202/173 |
| 2013/0270100 | A1 | | 10/2013 | Kwak et al. |
| 2014/0061958 | A1 | * | 3/2014 | Sparrow .................. B01D 1/16 |
| | | | | 261/140.1 |
| 2014/0174903 | A1 | * | 6/2014 | Edwards ........... B01D 53/1425 |
| | | | | 95/267 |
| 2014/0360859 | A1 | * | 12/2014 | Faidi .................... B01D 1/0035 |
| | | | | 203/10 |
| 2015/0047963 | A1 | * | 2/2015 | Roch ........................ C02F 1/10 |
| | | | | 202/185.1 |
| 2016/0251237 | A1 | * | 9/2016 | Reda ........................ C02F 1/06 |
| | | | | 203/11 |

OTHER PUBLICATIONS

CN203498115U_ENG (Espacenet machine translation of Li) (Year: 2014).*
CN105174339A_ENG (Espacenet machine translation of Zheng) (Year: 2015).*

* cited by examiner

SYSTEM FOR DESALINATING SALTWATER

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

FIELD OF THE INVENTION

One or more embodiments of the invention generally relate to water purification. More particularly, the invention relates to water desalination systems.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Some areas of the world may occasionally have natural and/or man-made events which depletes an area's clean water supply. Water sources may be present near a given area, but may be inconsumable without purification. Typically, a lake or an ocean provides a large quantity of easily accessible, but unclean, water. A system to purify and/or desalinate water from lakes and/or oceans may be desirable at locations near large bodies of water.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that current methods of desalinating water may be include systems involving boiling water and/or reverse osmosis. A boiling water desalination system may heat up a volume of water and create clean water in steam form. A reverse osmosis desalination system may filter salt out of salt water to attain clean water. Typical desalination systems may require a significant amount of energy and/or time to operate. An aspect of the present embodiment is to filter salt water with free energy from a desalination system's surrounding environment.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A depicts a top view, and FIG. 1B depicts a side view;

FIG. 2A depicts a top view, and FIG. 2B depicts a side view;

Figures 1A, 1B:
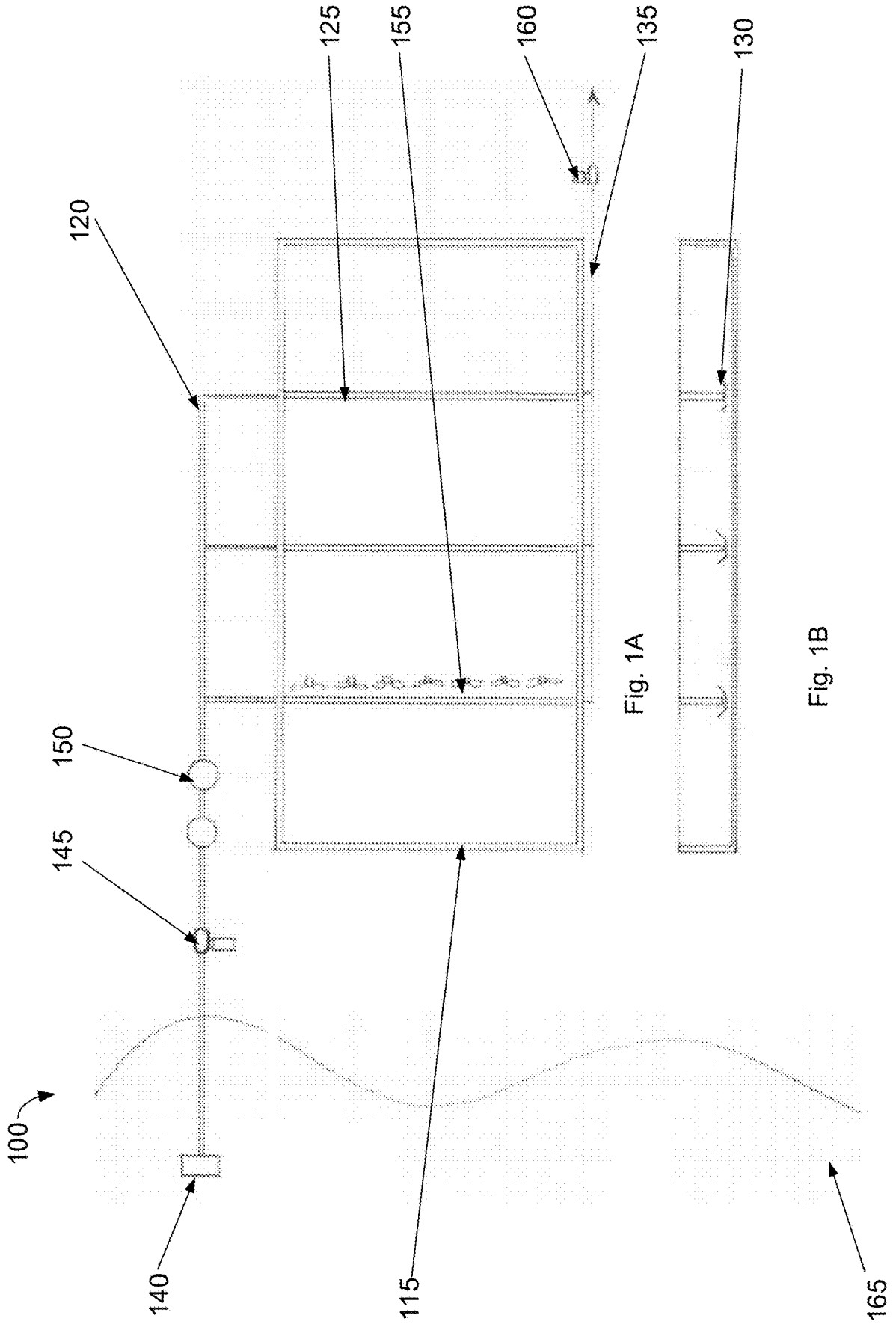
FIGS. 1A and 1B illustrate an exemplary water desalination system, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys, Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention and variations thereof, relate to water desalination systems. In one embodiment of the present invention, a water desalination system desalinates ocean, sea, brackish, or brine water via a temperature differential.

FIGS. 1A and 1B illustrate an exemplary water desalination system 100, in accordance with an embodiment of the present invention. FIG. 1A depicts a top view of water desalination system 100, and FIG. 1B depicts a side view of water desalination system 100. Water desalination system 100 may comprise of a water enclosure 115, one or more water supply lines 120, one or more cooling coils 125, one or more condensation capture pans 130, and one or more fresh water output lines 135. Water enclosure 115 may be any sealed environment capable of being heated by solar radiation. Water enclosure 115 walls and floor may be created from any water tight material such as, without limitation, concrete, plastic, steel, aluminum, wood, clay confining layer for floor, etc . . . . Water enclosure 115 ceiling may be created from any type of transparent and/or semi-transparent material that allows solar radiation to pass such as, without limitation, glass, clear plastic, translucent polymer panels, etc. Water enclosure 115 may be an open roof enclosure. Water enclosure 115 ceiling may be made of glass that lets solar radiation through in one direction and trap the heat and radiation in the other. Water desalination system 100 may comprise of one or more water supply lines 120 which may supply water enclosure 115 with saline water from one or more water sources including, but not limited to, sea or ocean water, brackish or briny water, and/or saltwater. Water supply lines 120 may further comprise of a suction filter 140, a pump 145, and one or more particle filters 150. One or more cooling coils 125 receive water from one or more water supply lines 120 and deposit water into water enclosure 115. High temperature, high humidity airflow may be directed towards one or more cooling coils 125 by one or more fans 155. Any condensation formed on the one or more cooling coils 125 may be collected by one or more condensation capture pans 130. One or more fresh water output lines 135 may collect desalinated water gathered in the one or more condensation capture pans 130. A pump 160 may assist in pumping water through one or more fresh water output lines 135.

During typical desalination operation, saline water from one or more body of water 165 including, but not limited to, sea or ocean water, brackish or briny water, and/or saltwater is drawn through suction filter 140 by pump 145. Suction filter 140 may prevent creatures, aquatic plants and/or debris from being drawn into the one or more water supply lines 120. One or more particle filters 150 may further filter debris and/or sediment from the salinated water traveling in the one or more water supply lines 120. Cool salinated water travels from the one or more water supply lines 120 to one or more cooling coils 125 located within water enclosure 115. Water temperature may vary with different bodies of water and time of the year. The water temperature may need to be below the dew point in the water enclosure 115 before condensation will occur as the salinated water travels through the one or more cooling coils 125. A level control system including, but not limited to, float switches connected to the supply lines 120 may assist in maintaining a constant level of water at the bottom of water enclosure 115. Water enclosure 115 may comprise of a transparent ceiling which may capture and/or store solar radiation within water enclosure 115 which may build a high temperature environment within water enclosure 115. On a sunny day near the equator, there may be 1,000 watts/square meter of energy entering the water enclosure. The temperature within the water enclosure, with no circulation in the cooling coils, may climb to approximately 140 degrees or higher Actual conditions in the enclosure including, but not limited to, temperature, humidity and dew point, may be determined with atmospheric or environmental sensors or detectors. A high humidity environment may form once the salinated water within water enclosure 115 begins to raise in temperature. Humidity within water enclosure 115 may condense on one or more cooling coils 125 and condensation may collect into one or more condensation capture pans 130. One or more fans 155 may direct airflow towards the one or more cooling coils 125 to increase the rate of condensation on the one or more cooling coils 125. Desalinated water from the condensation collected from one or more cooling coils 125 may be pumped from one or more condensation capture pans 130 through one or more fresh water output lines 135 by a pump 160. The desalinated water may be pumped directly into a fresh water container for current or future use. Fresh water may be drawn from one or more fresh water output lines for human use and/or consumption.

It may be appreciated by a person with ordinary skill in the art, in light of and in accordance with the teachings of the present invention, that a high temperature, high humidity environment may be created in water enclosure 115 through virtually any means. The environment in water enclosure 115 may be heated and humidified by means such as, without limitation, direct exposure to sunlight, microwave radiation, electrolysis, reflecting mirrors directing sunlight into the enclosure, evaporation, etc. In an alternative embodiment of the present invention, solar panels may power heating elements within water enclosure 115. In still another alternative embodiment of the present invention, a chemical reaction may heat water enclosure 115. In additional embodiments of the present invention, increasing the temperature of the saline water within water enclosure 115 with at least one of the heating and humidifying means above, may increase humidity or moisture for conversion to liquid. A high air humidity within water enclosure 115 may increase the accumulation of desalinated water droplet or liquid formation on an outside surface of cooling coils 125 as a result of condensation. The increased condensation increases the amount of desalinated water to be gathered by condensation capture pans 130.

It may be appreciated by a person with ordinary skill in the art, in light of and in accordance with the teachings of the present invention, that any additional heating and/or cooling means may be implemented in water desalination system 100. One or more cooling coils 125 may be cooled actively, adjustably, and/or passively by means such as, without limitation, refrigeration devices, pressurizes. As temperature of one or more cooling coils 125 drops, accumulation of water droplet or liquid formation on cooler surfaces increases as a result of condensation. Water enclosure 115 may be heated actively and/or passively by means such as, without limitation, microwaves, heating coils, direct exposure to sunlight, reflecting mirrors directing sunlight into the enclosure, etc. Increasing the temperature of the saline water within water enclosure 115 with at least uone of the above heating means may increase the conversion of saline water to gas, humidity or moisture for conversion to liquid. In an alternative embodiment of the present invention, one or more water supply lines 120 may be buried underground to maintain cooler water temperatures. In another alternative embodiment of the present invention, the inside of water enclosure 115 may be coated in a radiation absorbent material to better retain solar radiation. In still another alternative embodiment of the present invention, the outside of water enclosure 115 may be insulated to better retain heat within the water enclosure. In additional alternative embodiments, increasing the temperature of the saline water in the water enclosure increases air humidity or moisture trapped in the water enclosure. The increased air humidity or moisture may increase or elevate the amount of water droplet accumulation in the cooling coils 125 as a result of condensation. Lowering the temperature of cooling coils 125 below which water droplets begin to condense, in combination with a high air humidity environment within water enclosure 115 may further increase the accumulation of desalinated water droplet or liquid formation on an outside surface of cooling coils 125 which increases the accumulation of desalinated water collected.

It may be appreciated by a person with ordinary skill in the art, in light of and in accordance with the teachings of the present invention, that water enclosure 115 may be created from virtually any materials and in any shape and/or size. Water enclosure 115 may be scaled to any size to meet a certain fresh water production rate and/or physical requirements. In another embodiment of the present invention, a water enclosure may be constructed from a thermal insulating material with a transparent ceiling. In an alternative embodiment of the present invention, water enclosure 115 may be created from entirely from glass to better absorb solar radiation. Different versions of the system may be designed to operate on an ocean going vessel to camping with refrigeration device for cooling coil.

It may be appreciated by a person with ordinary skill in the art, in light of and in accordance with the teachings of the present invention, one or more water supply lines 120 and one or more fresh water output lines 135 may be configured to receive salinated water from one or more sources and output desalinated water to one or more destinations. In another embodiment of the present invention, multiple sources of water may be drawn for salinated water for one or more water supply lines 120.

It may be appreciated by a person with ordinary skill in the art, in light of and in accordance with the teachings of the present invention, that virtually any means for condensation collection may be used with and/or substituting condensation capture pans 130. Condensation collection means may include, without limitation, moisture absorbent clothes, sponges, etc. In an alternative embodiment of the present invention, moisture capturing sponges may gather fresh water from ambient humid air and may be compressed to release the captured fresh water.

It may be appreciated by a person with ordinary skill in the art, in light of and in accordance with the teachings of the present invention, that one or more pumps 145 and 160 may be present in water desalination system 100 to control input and output water flow. In another embodiment of the present invention, one or more pumps 145 and 160 may be used to keep the water level within water enclosure 115 at a constant level.

It may be appreciated by a person with ordinary skill in the art, in light of and in accordance with the teachings of the present invention, that suction filter 140 and one or more particle filters 150 may be designed to filter any type of debris and/or impurity within water desalination system 100. In another embodiment of the present invention, additional particle filters 150 may be present at one or more fresh water output lines 135 to filter any type of chemical impurities in the desalinated water.

It may be appreciated by a person with ordinary skill in the art, in light of and in accordance with the teachings of the present invention, that airflow within water desalination system 100 may be maintained by means other than one or more fans 155. Airflow within water desalination system 100 may be maintained by means such as, without limitation, a temperature gradient across different ends of water enclosure 115, fluid movement within water enclosure 115. In an alternative embodiment of the present invention, a mechanical stirring apparatus may be used to create airflow within water desalination system 100.

It may be appreciated by a person with ordinary skill in the art, in light of and in accordance with the teachings of the present invention, that water desalination system 100 may be installed on virtually any vehicle, vessel, and/or location. In another embodiment of the present invention, water desalination system 100 may be installed on a sea faring ship. In an alternative embodiment of the present invention, water desalination system 100 may be installed into a backpack for easy transportation. A super large version of the system may supply fresh water to a city or for agricultural use.

It may be appreciated by a person with ordinary skill in the art, in light of and in accordance with the teachings of the present invention, that water desalination system 100 may purify and/or concentrate other liquids and/or chemicals. In an alternative embodiment of the present invention, water desalination system 100 may concentrate chemicals by removing water from the chemicals.

Figures 2A, 2B:
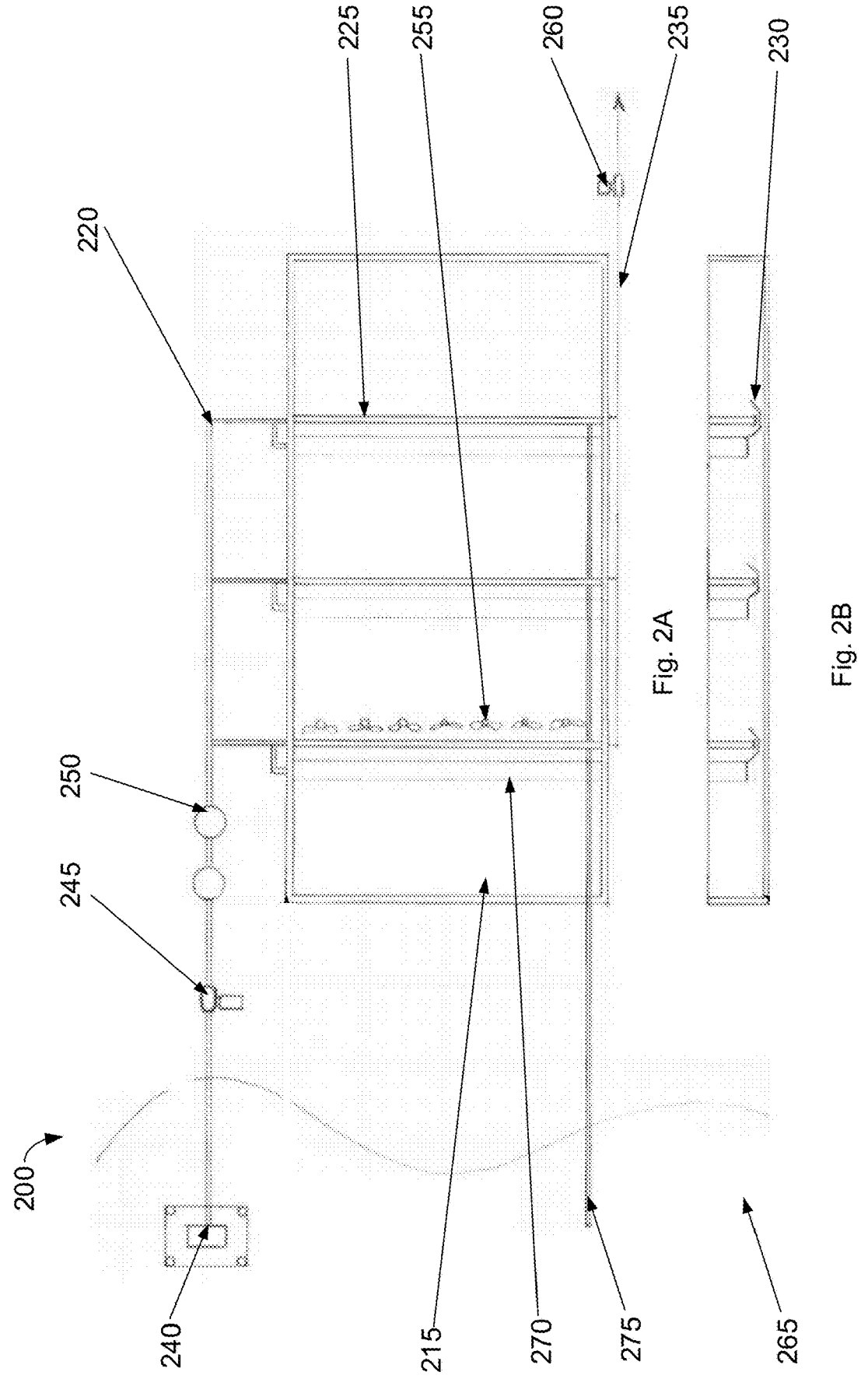
FIGS. 2A and 2B illustrate an exemplary water desalination system with humidity re-saturation, in accordance with an embodiment of the present invention.

FIGS. 2A and 2B illustrate an exemplary water desalination system with humidity re-saturation 200, in accordance with an embodiment of the present invention. FIG. 2A depicts a top view of water desalination system with humidity re-saturation 200, and FIG. 2B depicts a side view of water desalination system with humidity re-saturation 200. Water desalination system with humidity re-saturation 200 may comprise of a water enclosure 215, one or more water supply lines 220, one or more cooling coils 225, one or more condensation capture pans 230, one or more fresh water output lines 235, one or more re-saturation units 270, and one or more effluent water lines 275. Water enclosure 215 may be any sealed environment capable of being heated by solar radiation. Water enclosure 215 walls and floor may be created from any water tight material such as, without limitation, concrete, plastic, steel, aluminum, wood, clay confining layer for floor, etc. Water enclosure 215 ceiling may be created from any type of transparent and/or semi-transparent material that allows solar radiation to pass such as, without limitation, glass, clear plastic, translucent polymer panels, etc. Water enclosure 215 may be created with open ceiling. Water desalination system with humidity re-saturation 200 may comprise of one or more water supply lines 220 which may supply water enclosure 215 with salinated water from one or more water sources. Water supply lines 220 may further comprise of a suction filter with a screen enclosure 240, a pump 245, and one or more particle filters 250. One or more cooling coils 225 receive cool water from one or more water supply lines 220. Water within one or more cooling coils may be removed from water desalination system with humidity re-saturation 200 via one or more effluent water lines 275. High temperature, high humidity airflow may be directed towards one or more cooling coils 225 and/or one or more re-saturation units 270 by one or more fans 255. Any condensation formed on the one or more cooling coils 225 may be collected by one or more condensation capture pans 230. One or more fresh water output lines 235 may collect desalinated water gathered in the one or more condensation capture pans 230. A pump 260 may assist in pumping water through one or more fresh water output lines 235.

During typical operation, salinated water from a body of water 265 is drawn through suction filter with a screened enclosure 240 by pump 245. Suction filter with a screened enclosure 240 may prevent creatures, aquatic vegetation and/or debris from being drawn into the one or more water supply lines 220. One or more particle filters 250 may further filter debris and/or sediment from the salinated water traveling in the one or more water supply lines 220. Cool salinated water travels from the one or more water supply lines 220 to one or more coiling coils 225 and/or one or more re-saturation units 270 located within water enclosure 215. Water temperature may vary with different bodies of water and time of year. Water temperature may need to be below the dew point that has been created in the water enclosure before condensation will occur. Water enclosure 215 may comprise of a transparent ceiling which may capture and/or store solar radiation within water enclosure 215. Depending on the time and location, a high temperature environment may form within water enclosure 215 and a high humidity environment may form once the salinated water within water enclosure 215 begins to raise in temperature. Environmental sensors and/or detectors coupled with timers may determine the temperature, humidity, dew point, and time of the day for an efficient use of the system. Humidity within water enclosure 215 may condense on one or more cooling coils 225 and condensation may collect into one or more condensation capture pans 230. Cooled water that may have been warmed after traveling through one or more cooling coils 225 may be removed from the system via one or more effluent water lines 275. Humidity and/or water desalination system water level may be controlled by a water level controlling device including, but not limited to, float switches, mechanical float valves, etc. controlling that flow from water supply line 220 into the base of water enclosure 215. One or more re-saturation units 270 are located after the cooling coils to, as the name implies, re-saturate the dry air leaving the cooling coils with moisture. One or more fans 255 may direct airflow towards the one or more cooling coils 225 and/or one or more re-saturation units 270 to increase the rate of condensation on the one or more cooling coils 225. Desalinated water from the condensation collected from one or more cooling coils 225 may be pumped from one or more condensation capture pans 230 through one or more fresh water output lines 235 by a pump 260. Fresh water may be drawn from one or more fresh water output lines for human use and/or consumption.

It may be appreciated by a person with ordinary skill in the art, in light of and in accordance with the teachings of the present invention, that one or more re-saturation units 270 may restore humidity within water enclosure 215 by virtually any means. Re-saturation units 270 may be, without limitation, cooling tower type fill sections with large surface areas, humidifier units, trickle valves, spray mist type nozzles, steam injection, etc. In an alternative embodiment of the present invention, re-saturation units 270 may be trickle valves which drip salinated water from one or more water supply lines 220 at a controlled rate. In another embodiment of the present invention, re-saturation units 270 may be cooling tower type fills with large surface areas for salinated water from one or more water supply lines 220 to travel over.

It may be appreciated by a person with ordinary skill in the art, in light of and in accordance with the teachings of the present invention, that waste and/or byproducts of water desalination may be removed and/or harvested from water enclosure 225. In another embodiment of the present invention, salinated water may be purged from water enclosure 225 via one or more effluent water lines 275. In yet another embodiment of the present invention, salt and/or other residues may be harvested from water enclosure 215 after all water has been desalinated in the water desalination system.

It may be appreciated by a person with ordinary skill in the art, in light of and in accordance with the teachings of the present invention, one or more elements of water desalination system with humidity re-saturation 200 may be controlled electronically to maintain the atmosphere within water enclosure 215. Elements such as, without limitation, pump 245 duty cycle, water enclosure 215 water level, fan 255 speed, water flow control valves, water level control device, fresh air ventilation for night time operation, etc. may be controlled to maintain a specific or optimal level of temperature, humidity, and/or fresh water output. In another embodiment of the present invention, the humidity of water desalination system with humidity re-saturation 200 may be regulated by controlling the flow of water entering one or more re-saturation units 270.

Figure 3:
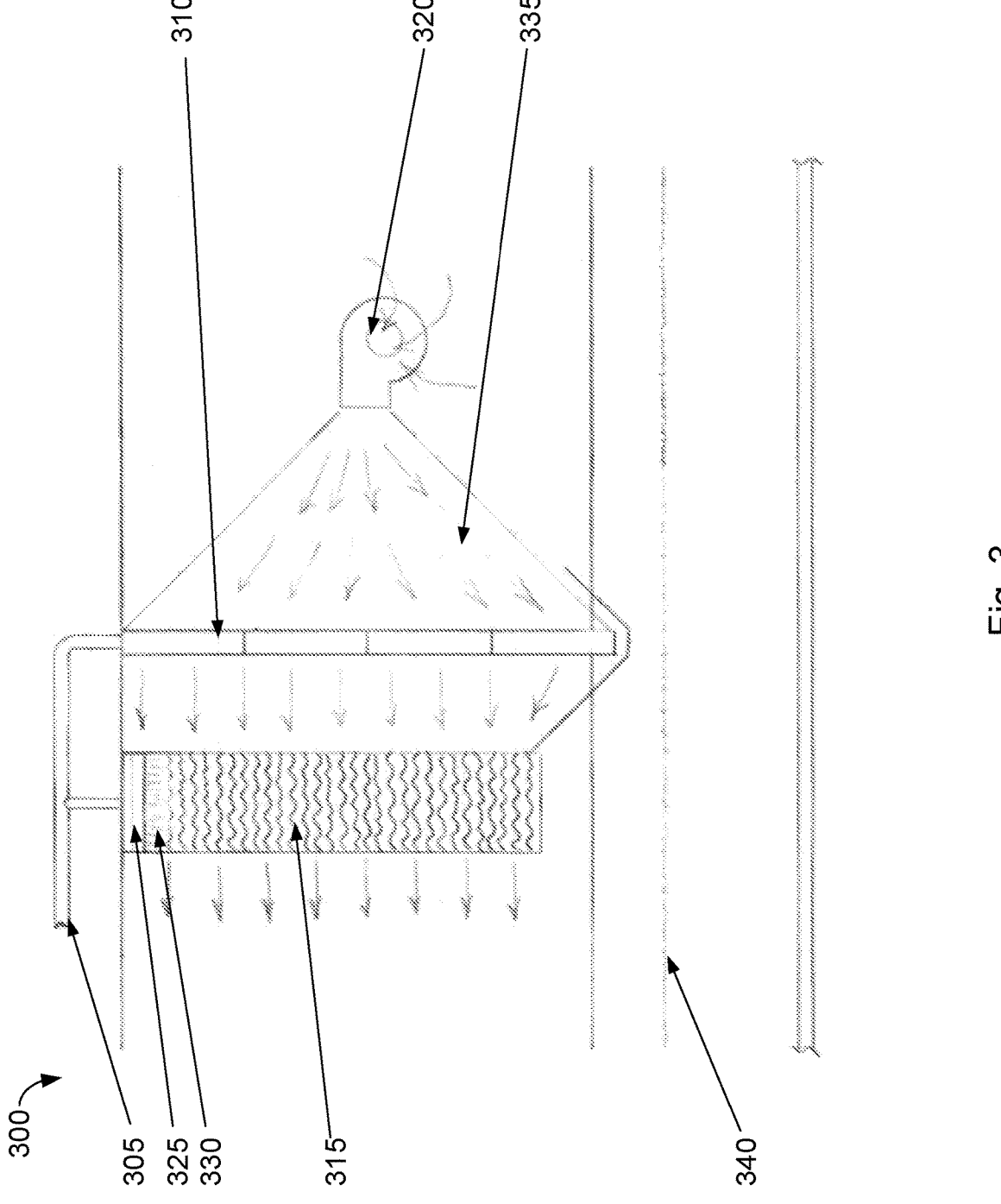
FIG. 3 illustrates an exemplary cooling section of a desalination system, in accordance with an embodiment of the present invention.

FIG. 3 illustrates an exemplary cooling section 300 of a desalination system, in accordance with an embodiment of the present invention. Cooling section 300 may comprise of a water supply line 305, a cooling coil 310, a re-saturation unit 315, and a fan 320. A re-saturation unit 315 may further comprise of a water trough 325 and a distribution deck 330 to control the flow of salinated water across the length of re-saturation unit 315.

During typical operation, salinated water runs through water supply line 305 to cooling coil 310 and re-saturation unit 315. Airflow 335 within cooling section 300 is directed towards cooling coil 310 and re-saturation unit 315 by a fan 320. Airflow 335 travels over cooling coil 310 and moisture in the air condenses on the cooling coil 310. Airflow 335 proceeds over re-saturation unit 315 and air is re-saturated with moisture. Airflow 335 further returns over the waterline 340 of salinated water within cooling section 300 and is recirculated by fan 320.

It may be appreciated by a person with ordinary skill in the art, in light of and in accordance with the teachings of the present invention, that humidity within cooling section 300 may be controlled by controlling one or more elements of cooling section 300. In another embodiment of the present invention, humidity may be controlled by controlling the temperature of cooling coil 310. In yet another embodiment of the present invention, humidity may be controlled by controlling the water flow across re-saturation unit 315. In still yet another embodiment of the present invention, humidity may be controlled by adjusting the fan speed of fan 320. In still yet another embodiment of the present invention, humidity may be controlled by controlling the rate of water flow in the cooling coil 310. In still yet another embodiment of the present invention, humidity may be controlled by opening a vent to allow the introduction of outside air.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112(6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing water desalination systems according to the present invention will be apparent to those skilled in the art. Various aspects of the invention have been described above by way of illustration, and the specific embodiments disclosed are not intended to limit the invention to the particular forms disclosed. The particular implementation of the water desalination systems may vary depending upon the particular context or application. By way of example, and not limitation, the water desalination systems described in the foregoing were principally directed to water desalination implementations; however, similar techniques may instead be applied to water reclamation, chemical purification, vessel water management, or environmentally friendly building solutions, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72 (b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
   a water supply line, wherein said water supply line is configured to distribute water from at least one or more water sources for desalination;
   a suction filter implement, wherein said suction filter implement comprises a screen enclosure that is configured to prevent water source debris or sediment from being drawn into said water supply line;

at least one or more water supply line pump device(s), wherein said one or more water supply line pump device(s) is/are configured to draw water from the at least one or more water sources;

a particle filter implement;

wherein said particle filter implement is configured to filter particles or sediment out of the water traveling through said water supply line section;

a water enclosure section, in which said water enclosure section is configured to receive water from said water supply line, wherein said water enclosure section is configured to be heated by solar radiation;

a transparent ceiling material, wherein said transparent ceiling material is operable for allowing solar radiation going into said water enclosure section;

a water level control system;

wherein said water level control system is configured to engage said one or more water supply line pump device(s);

wherein said water level control system is further configured to be operable for controlling water from said water supply line;

wherein said water level control system is further configured to maintain a predetermined water level inside said water enclosure section;

an array of reflecting mirrors, wherein said array of reflecting mirrors being configured to be operable for directing solar radiation towards said water enclosure section;

a radiation absorbent material, wherein said radiation absorbent material is configured to operably retain solar radiation within an inner portion of said water enclosure section;

at least one cooling coil implement(s), said at least one cooling coil implement(s) having an outer surface that is configured to at least accumulate liquid or water droplets when humidity or moisture within said water enclosure section comes in contact with said outer surface of said at least one cooling coil implement(s);

a condensation capture pan that is configured to gather at least the accumulated water droplets from said at least one cooling coil implement's outer surfaces;

a re-saturation unit, wherein said re-saturation unit is configured to re-saturate dry air with moisture;

an environmental detector implement;

wherein said environmental detector implement being configured to determine at least one of humidity and dew point within said water enclosure section;

a trickle valve device;

wherein said trickle valve device is configured to be operable for controlling water entering said re-saturation unit at a predetermined rate;

an effluent water line implement, wherein water within said at least one cooling coils implement(s) is/are operable for purging via said effluent water line implement; and a refrigeration device;

wherein said refrigeration device is configured to adjustably bring down the temperature on the outer surface of said at least one cooling coil implement.

2. The system of claim 1 further comprising:

an insulation material, wherein said insulation material is engaged on an outside surface portion of said water enclosure section, and wherein said insulation material is configured to be operable for retaining heat within said water enclosure section; and a floor portion of said water enclosure section, wherein said floor portion is made of water tight material.

3. The system of claim 1, in which said water level control system comprises:

at least one or more float switch(es) that is/are configured to turn the water supply line on or off; and a mechanical float valve engaged with said water supply line and being operable for effectuating the turning on or off of the water supply line.

4. The system of claim 1, further comprising:

an insulation material;

wherein an outside surface of said water enclosure section is insulated by said insulation material to generally retain heat within said water enclosure section; and wherein said transparent ceiling material comprises at least one of, a glass implement, a clear plastic implement, and a translucent polymer panel implement that is configured to be operable for allowing solar radiation going into said water enclosure section and trap heat or radiation in the opposite direction.

5. The system of claim 1, further comprising:

an output line section that is configured to channel the accumulated water droplets from said condensation capture pan for utilization or storage;

an output pump device; and wherein said output pump device being configured to pump water from said condensation capture pan through said output line section.

6. The system of claim 1, further comprising:

a heating element instrument disposed within said water enclosure section; and a solar panel appliance, wherein said solar panel appliance is configured to power said heating element instrument.

7. The system of claim 1, further comprising:

at least two or more trickle valve devices; and wherein said two or more trickle valve devices are configured to drip water entering said re-saturation unit from said water supply line section at a predetermined controlled rate.

8. The system of claim 1, further comprising a water flow control valve device that is configured to regulate the humidity within said water enclosure section by controlling the flow of water entering said one or more cooling coil implement.

9. The system of claim 1, further comprising:

an environmental sensor device, wherein said environmental sensor device is configured to determine a temperature within said water enclosure section; and an environmental timer device, wherein said environmental timer device is configured to determine a time of day.

10. The system of claim 9, in which said re-saturation unit section further comprises:

a water trough implement, wherein said water trough implement is configured to distribute water across a length of said re-saturation unit; and a distribution deck portion that is configured to control a flow of water across a proximate length of said re-saturation unit.

11. The system of claim 9, further comprising a pump duty cycle control device that is configured to further control a flow of water entering said re-saturation unit.

12. The system of claim 1, further comprising:

at least one or more output line pump device(s); and wherein said one or more output line pump device is/are configured to assist in harvesting the accumulated water droplets from said condensation capture pan for consumption, utilization or storage.

13. The system of claim 5, further comprising a chemical particle filter connected to said output line section, wherein said chemical particle filter is configured to filter chemical impurities in the desalinated water.

14. A system consisting of:

means for siphoning water from at least one or more water sources;

means for preventing water source debris or sediment from being drawn into said water siphoning means;

means for filtering particles or minerals out of the water traveling through said water siphoning means;

means for receiving the water from said water siphoning means, wherein said water receiving means being further configured to be operable for desalination of the water;

means for elevating a rate of evaporation of the water to increase the humidity or moisture within said water receiving means;

means for directing solar radiation towards said water receiving means to increase the temperature or humidity within said water receiving means;

means for collecting water or liquid droplets due to condensation;

means for gathering water droplets from said collecting means;

means for channeling the water droplets out of said gathering means for consumption, utilization or storage;

means for pumping water out of said water channeling means to keep a water level within said water receiving means at a constant level;

means for increasing a rate of condensation within said water receiving means;

means for creating an airflow being operable to saturate the air within said water receiving means with moisture; and means for regulating the humidity or moisture within said water receiving means.

15. A system comprising:

a water supply line, wherein said water supply line portion is configured to distribute water from at least one or more water sources for desalination;

a suction filter implement with a screen enclosure that is configured to prevent water source debris or sediment from being drawn into said water supply line;

a pump device being configured to be operable to draw saline water from the at least one or more water sources;

a particle filter implement being configured to filter particles or debris out of the saline water traveling through said water supply line portion;

a water enclosure section, in which said water enclosure section comprises one or more water enclosures, wherein each of said one or more water enclosures are configured to receive the saline water from said water supply line, wherein said water enclosure section is further configured to be operable for desalination of the saline water;

a wall section, in which said wall section comprises at least three or more walls that are operable to maintain heat within an inner portion of said water enclosure section;

a radiation absorbent material, said radiation absorbent material coating said inner portion of said wall section, wherein said radiation absorbent material is configured to be operable for retaining solar radiation within said water enclosure section;

a floor segment of said water enclosure section made of water tight material;

a ceiling segment of said water enclosure section made of transparent and/or semi-transparent material that is configured to allow solar radiation to pass through and hold heat;

a cooling coil implement, in which said cooling coil implement comprises at least one or more cooling coils, wherein water from said water supply line travels through each of said one or more cooling coils that are operable for having a cold outer surface, and wherein said cold outer surface is configured to accumulate liquid or water droplets from the humidity or moisture within said water enclosure section, due to condensation;

an environmental detector implement disposed within said water enclosure section, said environmental detector implement being configured to determine at least one of, humidity and dew point within said water enclosure section;

a condensation capture pan implement, in which said condensation capture pan implement comprises a multiplicity of condensation capture pans that are configured to gather accumulated water droplets from each of said cooling coil outer surfaces;

an output line portion that is configured to channel desalinated water from said multiplicity of condensation capture pans for utilization or storage;

an output pump device engaged with said output line portion, wherein said output pump device being configured to pump water from said condensation capture pan through said output line portion and to keep a water level within said water enclosure section at a constant level;

a re-saturation unit that is disposed within said water enclosure section, in which said re-saturation unit comprises a multiplicity of re-saturation units that are configured to increase moisture within said water enclosure section;

a water level control device, wherein said water level control device is configured to control a flow of water entering said re-saturation unit, to control a humidity within said re-saturation unit;

a trickle valve device, wherein said trickle valve device is configured to drip the water entering said re-saturation unit at a controlled rate;

a water trough implement, wherein said water trough implement is configured to distribute saline water across a length of said re-saturation unit; and a fan implement, in which said fan implement comprises at least one or more fans, wherein said fan implement is configured to direct an airflow towards at least one of, said multiplicity of cooling coils and at least one of said multiplicity of re-saturation units based on said determined at least one of humidity and dew point within said water enclosure section, wherein said fan implement is configured to increase a rate of condensation to be collected from said at least one or more cooling coils and said re-saturation unit.

16. The system of claim 15, further comprising:

an environmental sensor implement that is configured to determine a temperature within said water enclosure section; and an environmental timer device that is configured to determine a time of day.

17. The system of claim 16, further comprising a fan speed controller implement that is configured to control a speed of said airflow directed towards at least one of said multiplicity of cooling coils and at least one of said multiplicity of re-saturation units.

* * * * *